United States Patent Office 3,460,293
Patented Aug. 12, 1969

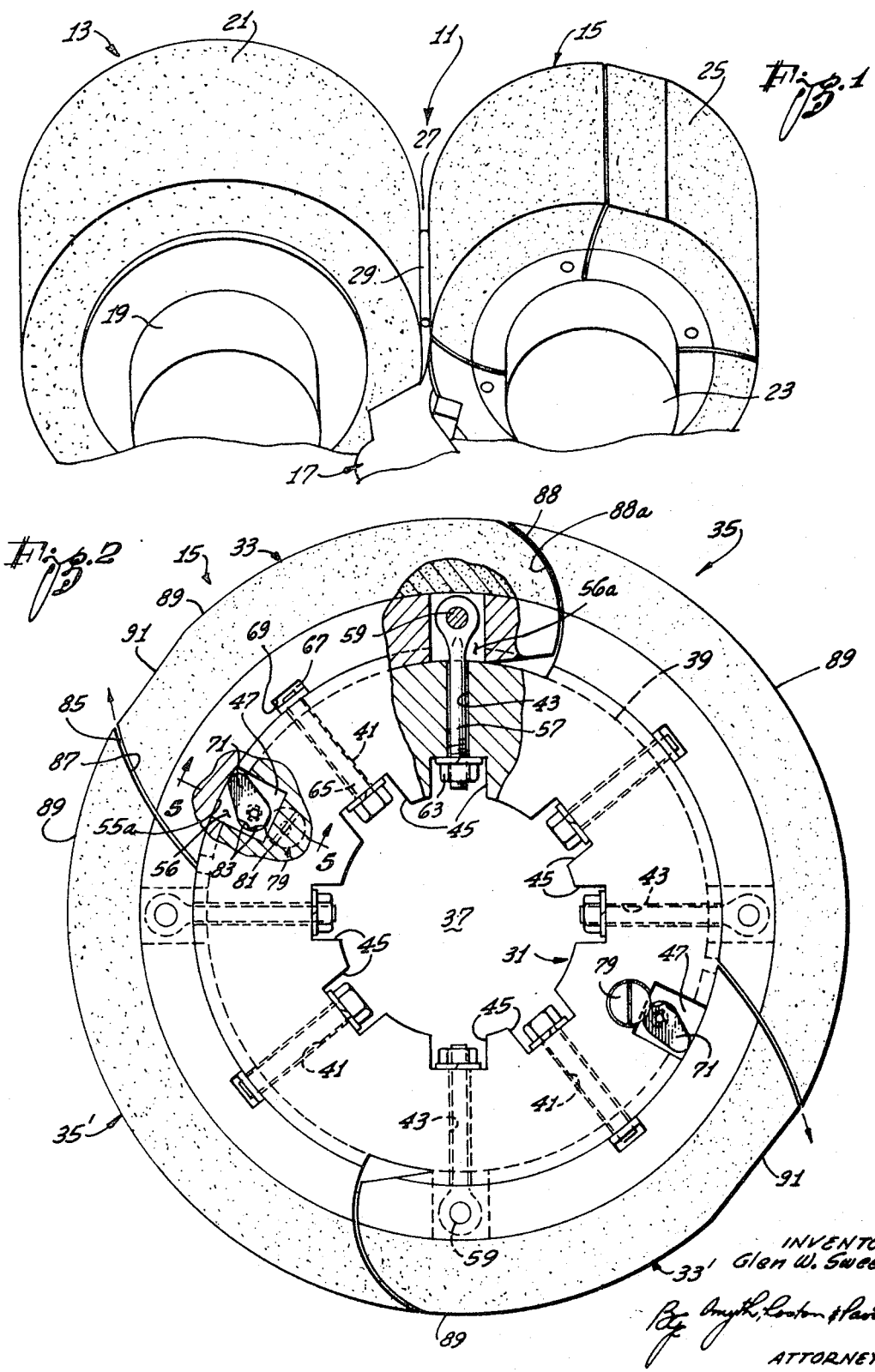

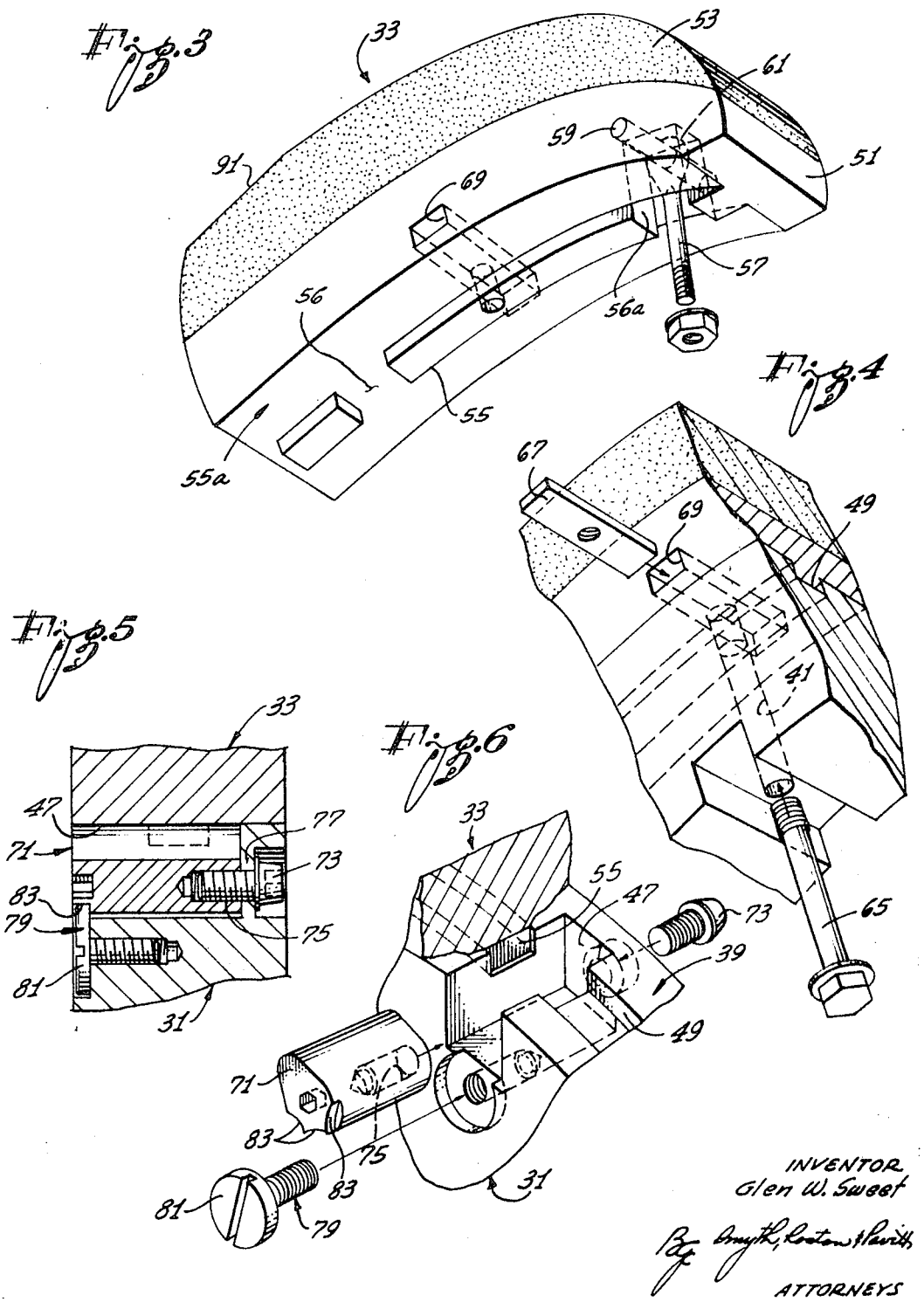

3,460,293
REGULATING WHEEL FOR CENTERLESS
GRINDER
Glen W. Sweet, 5524 W. 123rd St., Hawthorne, Calif.
90250; Virginia L. Sweet, administratrix of said Glen
W. Sweet, deceased
Filed Dec. 9, 1966, Ser. No. 600,433
Int. Cl. B24b 5/30; B24d 5/06
U.S. Cl. 51—103
13 Claims

ABSTRACT OF THE DISCLOSURE

This disclosure describes a regulating wheel for a centerless grinder. The regulating wheel, as disclosed, includes a hub portion and a plurality of peripheral segments affixed to the hub portion and having abrasive peripheral surfaces which define the peripheral surface of the regulating wheel. At least one of the peripheral segments is affixed to the hub portion for movement generally radially thereof to thereby alter the contour of the regulating wheel to facilitate setting up of the centerless grinder.

---

This invention relates to a wheel, the contour of the periphery of which is quickly and easily variable to the desired configuration. Although the wheel of this invention is subject to many different uses, it is particularly adapted for use as a regulating wheel for a centerless grinder.

A typical centerless grinder includes a rotatably mounted grinding wheel, a rotatably mounted regulating wheel, and a work rest. The grinding wheel and regulating wheel are usually arranged so that their peripheries are separated slightly by a small space and the work rest supports the work in this space. The grinding wheel grinds the work. The regulating wheel regulates the speed of rotation of the work on the work test and urges the work against the grinding wheel in the desired manner so that the work is ground to the desired shape.

The periphery or working surface of the regulating wheel engages the work and urges it against the grinding wheel. It is important, therefore, that the contour of the working surface be very accurately shaped so that the work will be urged against the grinding wheel at the desired rate to cause the desired grinding action to occur. The contour of the working surface of the regulating wheel will vary, depending upon the configuration of the work, the type of material from which the work is constructed, the desired grinding speed, and various other factors. The contour of the working surface is not a simple arc having its center at the center of rotation of the regulating wheel. It is usually necessary to alter the configuration of the working surface for each different part that is to be ground and also when the working surface becomes worn from extended usage.

Prior art regulating wheels are solid members and often include a central portion with an abrasive material bonded thereto and forming the periphery or working surface of the wheel. One very serious drawback to this type of regulating wheel is that the essential step of shaping the contour of the working surface is very time consuming and requires a skilled workman. It may take a skilled workman up to one-half of a working day just to form the desired working surface contour on the regulating wheel. In an attempt to reduce the time required to accomplish this function, a cam cutting machine has been developed. This cam cutting machine, however, is still not sufficiently fast and is quite expensive.

According to the present invention, the contour of the working surface of a regulating wheel is formed much more rapidly than has been possible heretofore. The contour of the working surface may be formed in as little time as thirty minutes and this may be done without any new or expensive accessory setup equipment. Furthermore, with a regulating wheel constructed in accordance with the present invention, the contour of the working surface thereof may be formed by an unskilled workman.

A further cost saving is realized with the present invention in that only the portion of the regulating wheel which is subject to wear need be replaced and the remainder of the wheel may be salvaged. Thus, when the regulating wheel of this invention wears out from extended use, it is only necessary to replace the abrasive portion thereof in a manner similar to relining of the conventional automobile brakes.

Briefly stated, the regulating wheel of this invention includes a hub portion rotatable about a rotational axis and a peripheral segment having a peripheral surface and secured to the hub portion for movement relative to the axis of rotation of the hub portion. The peripheral surface of the peripheral segment forms at least a portion of the periphery of the regulating wheel and is engageable with the work to cause the work to engage the grinding wheel. To alter the configuration of the periphery of the regulating wheel it is only necessary to move the peripheral segment and hence the peripheral surface thereof relative to the axis of rotation of the hub portion.

More particularly, the peripheral segment is pivotally secured to the hub portion about a pivotal axis which is generally parallel to the axis of rotation of the hub portion. Thus, the peripheral surface of the peripheral segment can be moved arcuately and generally radially relative to the hub portion by merely pivoting the peripheral segment about the pivotal axis. The working surface of the regulating wheel is initially dressed so that it forms a circle having its center at the axis of rotation of the regulating wheel, and the peripheral surface of the segment forms an arcuate portion of the circle. It has been found that by pivoting the segment about its pivotal axis the desired working surface contour is formed. Only slight, e.g., one or more thousandths of pivotal movement of the peripheral segment radially outwardly of the hub portion is required to produce the desired configuration of the periphery of the regulating wheel. Suitable calibrations may be provided to advise the workman of the extent to which the segment must be moved to achieve the desired contour.

Preferably, the pivotal axis will be positioned nearer one end of the segment than the other so that said one end will move a minimum amount when the segment is pivoted. This also provides better support for the segment. Usually the pivotal axis will be closely adjacent said one end of the segment to further minimize the amount of movement of said one end of the segment.

It is preferred to provide several of the peripheral segments on the periphery of the hub portion. According to one practice of the invention, four of the segments are provided, alternate ones of which are movable outwardly radially of the hub portion and the remaining segments are fixed to the hub portion. Each of the segments has a peripheral surface and the peripheral surfaces are substantially continuous to form the working surface of the regulating wheel.

In utilizing such a regulating wheel, the working surface is dressed with a standard machine dresser to get the surface round and true and to make the corners square. This dressing operation is performed with the movable peripheral segments in their innermost radial position. Each of the movable segments are then moved radially outwardly about their respective pivotal axes to form the desired working surface configuration and they are then firmly fixed at such selected location. The sparkout areas, which cause the finish grinding of the work to occur are then formed by standard procedures and the wheel is then ready for use. The sparkout areas may be formed by dressing the highest or outermost portion of the working surface with a standard machine dresser. The total time needed for making the regulating wheel ready for use is about one-half hour and can be performed by a relatively unskilled workman.

Various attachment means may be utilized to secure the peripheral segments to the hub portion. Preferably, the attachment means should be accessible from the exterior of the regulating wheel so that all adjustments thereof may be quickly and easily made.

To move the movable peripheral segments radially of the hub portion, it is preferred to utilize an adjusting cam. Preferably, the cam is mounted in a recess in the hub portion and is engageable with the inner surface of the pheripheral segment. Access to the cam is readily attainable from the exterior of the regulating wheel through the recess in which it is mounted.

The invention, both as to its organization and method of operation, together with further features and advantages thereof may best be understood by reference to the following description taken in connection with the accompanying drawings, in which:

FIG. 1 is a fragmentary perspective view of a portion of a centerless grinding machine;

FIG. 2 is a side elevational view partially in section of a regulating wheel constructed in accordance with the teachings of this invention;

FIG. 3 is an enlarged perspective view of one of the peripheral segments;

FIG. 4 is an enlarged fragmentary perspective view showing one of the attachment members and how it is used to secure one of the peripheral segments to the hub portion;

FIG. 5 is a sectional view taken along line 5—5 of FIG. 2 and illustrating a preferred form of the adjusting cam utilized to adjust the angular position of the peripheral segment; and FIG. 6 is a perspective exploded view of the adjusting cam, the mounting means therefor, and the means for fixing the position of the adjusting cam.

Referring to the drawings and in particular to FIG. 1 thereof, reference numeral 11 designates a centerless grinding machine. The centerless grinding machine includes a grinding wheel 13, a regulating wheel 15, and a work rest 17. The grinding wheel 13 is rotatably mounted on a shaft 19 and has a peripheral grinding surface 21. The regulating wheel 15 is similarly rotatably mounted on a shaft 23 and has a peripheral working surface 25. The wheels 13 and 15 are mounted so that the surfaces 21 and 25 thereof are confronting and are slightly separated from each other by a space 27. The work rest 17 supports the work 29 in the space 27. The work 29 is rotated on the work rest 17 by the regulating wheel 15 and the working surface 25 urges the work 29 into engagement with the grinding surface 21 at the required rate and in the desired manner so that the work will be ground to the desired shape.

Referring to FIG. 2, the regulating wheel 15 includes a hub portion 31, two movable peripheral segments 33 and 33', and two fixed peripheral segments 35 and 35'. Although four of the segments are illustrated, it should be understood that various numbers thereof may be provided as desired. The segments are secured to the hub portion 31 and extend circumferentially to form the working surface 25 of the regulating wheel 15.

The hub portion 31 is a generally annular metal member having a central axial passage 37 extending therethrough and an outer periphery 39 (FIGS. 2 and 6). Four attachment bores 41 spaced approximately 90 degrees apart extend radially through the hub portion 31 from the passageway 37 to the periphery 39 and four mounting bores 43 are similarly spaced and also extend radially through the hub portion 31. Each of the bores 41 and 43 terminate in an axially extending groove 45, each of which opens at the passageway 37.

The hub portion 31 also has a pair of axially extending cam receiving recesses 47 which open at the periphery 39. As best seen in FIGS. 4 and 6, the hub portion 31 has a circumferentially extending groove 49 formed in the periphery 39 thereof.

For simplicity in design and manufacture, it is preferred that the movable segments 33, 33' be identical to the fixed segments 35, 35'. As best seen in FIG. 3, the segment 33 includes an inner block 51 constructed of a metal, such as steel, and an abrasive section 53 constructed of a suitable abrasive material and bonded to the block 51. The block 51 has a tongue 55 extending circumferentially along an inner surface 55a thereof and adapted to be received in the groove 49 as shown in FIGS. 2 and 4–6. The tongue 55 is broken at one area to define a gap 56 and is broken at another area by a recess 56a.

The segment 33 is pivotally secured to the hub portion 31 by a bolt 57 (FIGS. 2 and 3) and a pin 59. The pin 59 is mounted in the block 51 in the recess 56a and the bolt 57 has an eye head 61 which rotatably receives the pin 59. The bolt 57 extends through one of the mounting bores 43 and is fixed therein by a nut 63. Thus, the segment 33 can pivot about the pin 59. It is apparent that the pivotal axis for the segment 33 is generally parallel to the axis of rotation of the hub portion 31. As shown in FIG. 2, the segments 33', 35 and 35' are similarly pivotally mounted to the hub portion 31.

To limit the extent to which the segment 33 is permitted to pivot outwardly radially away from the hub portion 31, a bolt 65 and a nut 67 are provided. As shown in FIGS. 2 and 4, the bolt 65 extends through one of the attachment bores 41 and terminates in an axially extending recess 69 formed in the block 51. The nut 67 is disposed in the recess 69 and receives the bolt 65. This securely fixes the outermost position to which the segment 33 can be moved and is readily adjustable to accommodate various positions of the segment 33.

The innermost radial position of the segment 33 is fixed by the engagement of the inner surface 55a of the segment with the periphery 39 of the hub portion 31. When it is desired to move the segment 33 radially outwardly, an adjusting cam 71 (FIGS. 2, 5 and 6) is utilized. As best seen in FIGS. 5 and 6, the cam 71 is mounted in the recess 47 for movement about an axial extending pivotal axis. The cam 71 is rotatably mounted by a screw 73 which is received in a threaded socket 75 in the cam and the head of which abuts an annular flangle 77 formed integrally with the hub portion 31. The screw 73 is pivotable in the annular flange 77 and the cam 71 is pivotable therewith. The cam 71 and the adjacent area of the hub portion 31 may be provided with calibrations to indicate the amount that it raises the segment 33.

As shown in FIG. 2, the cam 71 extends through the gap 56 and engages the inner surface 55a of the segment 33. By loosening the nut 67, the cam 71 can be used to adjust the angular position of the segment 33 as desired. If desired, the cam 71 may be calibrated so that the workman will be advised of the amount of movement imparted to the segment 33.

The angular position of the cam 71 may be fixed by any suitable means. One such means includes a screw 79 which is threadly received in the hub portion 31. The screw 79 has a head 81 which is selectively engageable with any of three arcuate grooves 83 formed at the outer end of the cam 71. With this arrangement, the cam is moved to the desired angular position to thereby effect the desired incremental movement of the segment 33 and then the screw 79 is tightened to cause the head 81 thereof to engage and seat within the appropriate arcuate groove 83. This firmly locks the cam 71 in the desired angular position. The cam 71 then locks the segment 33 against radial inward movement. The segment 33' is similarly provided with a cam 71, but no adjusting cams are required for the fixed segments 35 and 35'.

The relative sizes of the grooves 83 and of the head 81 have been enlarged in the drawings for clarity, it being understood that in actual practice these members would be appropriately sized so that a very fine adjustment of the position of the peripheral surface 89 could be obtained. If desired, the grooves 83 could also be arranged in several rows extending circumferentially along the cam 71, the rows being spaced axially from each other and having the grooves thereof offset to provide additional settings of the cam. Alternatively, other means which provide for an infinite number of cam position settings could be utilized. It is also possible to utilize a speed reduction mechanism which would impart only slight movement to the cam 71 in response to a relatively large amount of imput movement.

As shown in FIG. 2, the segments 33 and 35' have confronting faces 85 and 87, respectively. The end faces 85 and 87 are arcuate and have their centers at the pivotal axis of the segment 33 which is defined by the axis of the pin 59. Thus, the end face 87 will not interfere with the angular movements of the segment 33 and its pivotal axis. Confronting end faces 88 and 88a on the segments 33 and 35, respectively, are also part circular and have their centers at the pivotal axis of the segment 33.

Each of the segments 33, 33', 35 and 35' have a peripheral surface 89. The peripheral surfaces 89 are substantially continuous as shown in FIG. 2 to form the working surface 25 of the regulating wheel 14.

In the embodiment illustrated, the segments 33 and 33' are both movable angularly generally radially of the hub portion 31 and both the cams 71 to effect the desired radial movement. The segments 35 and 35', although removable from the hub portion 31, do not have cams 71 and are adapted to remain in the same fixed position illustrated in FIG. 2. It is the peripheral surfaces 89 on the movable segments 33 and 33' which must be accurately shaped in order to perform the desired grinding operation.

In preparing the regulating wheel for use in a centerless grinder, the wheel is dressed with a standard machine dresser to make the wheel round and true and to make the corners thereof square. Depending upon the type of grinding that is to be done, the work surface 25 may be relieved or otherwise provided with an irregular or arcuate contour in the axial direction. In the embodiment shown, however, the working surface 25 is smooth in the axial direction and arcuate in the circumferential direction.

The step of dressing the regulating wheel is done with the peripheral segments 33 and 35 in their zero position, i.e., in the innermost radial position. In order to provide the working surface 25 with the desired configuration, the cams 71 are rotated to engage the underside of the segments 33 and 33' to cam them slightly radially outwardly. When the segments have been moved out the desired amount, the nut 67 is tightened and the screw 79 is turned axially into its socket in the hub portion 31 so that the head 81 thereof will engage and seat in one of the shoulders 83 of the cam. This locks the cam in the selected position. The cam, therefore, serves to prevent inward movement of the segments 33 and 33' and the nut 67 and the bolt 65 serve to prevent radial outward movement of these segments.

With the segments 33 and 33' moved radially outwardly to the selected position, as described above, the peripheral surfaces 89 thereof describe the desired arc or external configuration to assure that the work 29 will be ground in the desired fashion. Next, it is necessary to form a pair of sparkout areas 91 which are located at the ends of the segments 33 and 33' which are remote from their respective pivotal axes. The sparkout areas 91 form a portion of the peripheral surface 89 of each of the segments 33 and 33' and cause the finish grinding work to be done. The sparkout areas 91 are arcuate and preferably form a portion of a circle having a radius greater than the radius of the remainder of the peripheral surface 89. The areas 91 are formed by grinding off a portion of the high end of the surface 89. The sparkout areas 91 have been shown substantially flat in FIG. 2 for clarity.

When the abrasive sections 53 become worn, the movable segments 33 and 33' are moved radially inwardly about their pivotal axes to the zero position in which the inner surfaces 55a thereof engage the periphery 39 of the hub portion 31. The working surface 25 is then redressed with a standard machine dresser to make the working surface round. Next, the cams 71 are utilized to move the segments 33 and 33' radially outwardly to the desired positions and the sparkout areas 91 are formed in the manner described hereinabove. When the abrasive sections 53 become worn so that they can no longer be used on the regulating wheel, the worn sections are removed and replaced with new abrasive sections.

As best seen in FIGS. 2 and 3, the pin 59 and hence the pivotal axis of the segment 33 is located closer to one end of the segment than the other. Usually, it is desirable to locate the pin 59 closely adjacent one end of the segment 33 as shown in FIG. 2. This location of the pin 59 is preferred because it substantially precludes movement of the righthand end of the segment 33 when this segment is being pivoted the slight amount required. In addition, the lefthand end of the segment 33 is raised or moved radially outwardly a maximum amount upon a slight angular movement of the segment. This is desirable so that the sparkout area 91 can be formed by grinding off this high portion of the peripheral surface 89. In addition, the segment 33 can be very securely retained in position when the pin 59 is located at one end of the segment and the other attachment members 65 and 71 are located as shown in FIG. 2.

With the present invention, the entire setup time is materially reduced and can be performed by unskilled labor. No expensive or special machines are required. Worn segments are easily redressed or replaced as required. The counterbores or recesses 47 make it possible to make all such adjustments easily from the exterior of the regulating wheel.

Although an exemplary embodiment of the invention has been shown and described, many changes, modifications and substitutions may be made by one having ordinary skill in the art without necessarily departing from the spirit and scope of this invention.

What is claimed is:

1. A regulating wheel for use in a centerless grinding device having a grinding wheel adjacent the regulating wheel and means for holding the work therebetween, said regulating wheel having a periphery engageable with the work and comprising:

a hub portion rotatable about a rotational axis;
    a peripheral segment;
    means for securing said peripheral segment to said hub portion for rotation therewith, said peripheral segment having a peripheral surface forming at least a portion of the periphery of the of the regulating wheel and being engageable with the work to cause the work to engage the grinding wheel;
    means for moving at least a portion of said peripheral surface of said peripheral segment relative to the axis of rotation of said hub portion to thereby alter the configuration of the periphery of the regulating wheel; and said means for securing including means for pivotally securing said peripheral segment to said hub portion adjacent one end of said peripheral segment to allow pivotal movement of said portion of said peripheral surface generally radially relative to the rotational axis of the hub portion.

2. A combination as defined in claim 1 wherein said peripheral segment is secured to said hub portion for rotation about a pivotal axis which is generally parallel to the axis of rotation of said hub portion.

3. In a segmentized wheel having a periphery for engaging work, the combination of:

a hub portion, said hub portion being rotatable about a rotational axis;

a peripheral segment having a peripheral surface forming at least a portion of the periphery of said wheel and engageable with the work;

means for mounting said peripheral segment on said hub portion for rotation therewith and for movement through a plurality of operative positions relative to said hub portion, said movement of said peripheral segment causing movement of at least a major portion of said peripheral surface generally radially relative to the axis of rotation of said hub portion, said peripheral surface extending circumferentially of said hub portion, at least a section of said peripheral surface being arcuate as it extends circumferentially;

adjustment means for selectively moving said peripheral segment generally radially relative to the axis of rotation of said hub portion to any of said operative positions whereby the configuration of the periphery of the wheel is altered; and means for fixing said peripheral segment in any of said operative positions.

4. A combination as defined in claim 3 wherein said means for mounting secures said peripheral segment to said hub portion for movement about a pivotal axis which is generally parallel to the axis of rotation of said hub portion and said operative positions are angular positions, respectively, of said peripheral segment about said pivotal axis.

5. A combination as defined in claim 3 wherein at least a portion of each of said adjustment means and said means for fixing are disposed in said hub portion and recess means is provided in said hub portion for providing access to said adjustment means and said means for fixing.

6. In a regulating wheel for use in a centerless grinder, the combination of:

a hub portion rotatable about a rotational axis;

a plurality of peripheral segments secured to said hub hub portion, each of said peripheral segments having an arcuate peripheral surface extending circumferentially of said hub portion, said peripheral surfaces being substantially continuous and forming a working surface for the regulating wheel;

at least one of said peripheral segments being pivotally secured to said hub portion for movement about a pivotal axis to any of a plurality of angular positions, said pivotal axis being generally parallel to said rotational axis of said hub portion, movement of said one peripheral segment varying the configuration of said working surface; and means for fixing said one peripheral segment at the desired angular position.

7. A combination as defined in claim 6 including cam means pivotally mounted within a recess in said hub portion for moving said one peripheral segment through said angular positions.

8. A combination as defined in claim 6 wherein said one peripheral segment and the peripheral segment adjacent thereto have confronting end faces, each of said end faces being arcuate with said rotational axis being substantially at the center of the arc of said end faces whereby the end face on said adjacent segment will not interfere with the movements of said one segment about said pivotal axis.

9. A regulating wheel for use in a centerless grinding device having a grinding wheel adjacent the regulating wheel and means for holding the work therebetween, said regulating wheel having a periphery engageable with the work and comprising:

a hub portion rotatable about a rotational axis;

a peripheral segment;

means for securing said peripheral segment to said hub portion for rotation therewith, said peripheral segment having a peripheral surface forming at least a portion of the periphery of the regulating wheel and being engageable with the work to cause the work to engage the grinding wheel; and means including cam means for moving at least a portion of said peripheral surface of said peripheral segment relative to the axis of rotation of said hub portion to thereby alter the configuration of the periphery of the regulating wheel.

10. A regulating wheel for use in a centerless grinding device having a grinding wheel adjacent the regulating wheel and means for holding the work therebetween, said regulating wheel having a periphery engageable with the work and comprising:

a hub portion rotatable about a rotational axis;

a peripheral segment having an abrasive peripheral surface;

means for mounting said peripheral segment on said hub portion for movement along a path through a plurality of operative positions relative to said hub portion, said mounting means also mounting said peripheral segment on said hub portion for rotation therewith;

said movement of said peripheral segment along said path moving at least a major portion of the peripheral surface of said peripheral segment generally radially of the hub portion;

said peripheral surface of said peripheral segment forming at least a portion of the periphery of the regulating wheel and being engageable with the work in each of said operative positions to cause the work to engage the grinding wheel whereby said movement of said peripheral segment alters the shape of the periphery of the regulating wheel; and means for selectively rigidly fixing said peripheral segment in any of said operative positions thereof to thereby permit selectively altering the configuration of the periphery of the regulating wheel.

11. In a centerless grinder for grinding work, the combination of:

a supporting structure;

a grinding wheel rotatably mounted on said supporting structure;

a regulating wheel having a peripheral working surface for urging the work against said grinding wheel;

means for mounting said regulating wheel on said supporting structure for rotation about a rotational axis with the peripheral working surface thereof confronting said grinding wheel;

work holding means for holding the work intermediate said grinding wheel and said peripheral working surface of said regulating wheel;

said regulating wheel including a movable segment defining at least a portion of the peripheral working surface, said segment being movable to any of a plurality of operative positions to alter the configuration of the peripheral working surface; and means for selectively retaining said movable segment in any of said operative positions.

12. A combination as defined in claim 11 wherein said regulating wheel also includes a base portion and means for mounting said movable segment on said base portion for movement about a pivotal axis extending generally parallel to said rotational axis to thereby move said movable segment to any of said operative positions, said base portion and said segment being rotatable together about said rotational axis.

13. A combination as defined in claim 12 wherein said movable segment is a peripheral segment extending circumferentially of said regulating wheel and terminating in circumferentially spaced ends, said pivotal axis lying adjacent one of said ends.

References Cited
UNITED STATES PATENTS

| | | | |
|---|---|---|---|
| 779,848 | 1/1905 | Hart | 51—206.5 |
| 1,850,054 | 3/1932 | Strickland et al. | 51—103 |
| 1,976,110 | 10/1934 | Binns | 51—103 |
| 2,887,276 | 5/1959 | Minarik | 51—206.5 X |

LESTER M. SWINGLE, Primary Examiner

U.S. Cl. X.R.

29—124; 51—206